US012042755B2

(12) United States Patent
Nurzia et al.

(10) Patent No.: US 12,042,755 B2
(45) Date of Patent: Jul. 23, 2024

(54) AIR FILTER AND ITS METHOD FOR MANUFACTURING

(71) Applicant: KNORR-BREMSE ESPANA SA, Getafe (ES)

(72) Inventors: Giovanni Nurzia, Madrid (ES); Martin Ryusuke Daniel Kambara, Madrid (ES)

(73) Assignee: KNORR-BREMSE ESPANA SA (ES)

( * ) Notice: Subject to any disclaimer, the term of this patent is extended or adjusted under 35 U.S.C. 154(b) by 763 days.

(21) Appl. No.: 17/059,801

(22) PCT Filed: May 27, 2019

(86) PCT No.: PCT/EP2019/063633
§ 371 (c)(1),
(2) Date: Nov. 30, 2020

(87) PCT Pub. No.: WO2019/228970
PCT Pub. Date: Dec. 5, 2019

(65) Prior Publication Data
US 2021/0205748 A1    Jul. 8, 2021

(30) Foreign Application Priority Data
May 30, 2018  (EP) ..................... 18175102

(51) Int. Cl.
*B01D 46/10* (2006.01)
*B01D 39/16* (2006.01)
*B01D 39/18* (2006.01)

(52) U.S. Cl.
CPC ......... *B01D 46/10* (2013.01); *B01D 39/1623* (2013.01); *B01D 39/18* (2013.01); *B01D 2239/065* (2013.01); *B01D 2275/10* (2013.01)

(58) Field of Classification Search
None
See application file for complete search history.

(56) References Cited

U.S. PATENT DOCUMENTS

| 5,288,298 A * | 2/1994 | Aston ................. B01D 46/521 96/135 |
| 5,620,545 A * | 4/1997 | Braun ................. B01D 46/521 156/205 |
| 6,156,089 A | 12/2000 | Stemmer et al. |
| 2004/0159239 A1* | 8/2004 | Nagem ................. B01D 46/62 55/486 |
| 2008/0034967 A1* | 2/2008 | Ping ................... B01D 39/1623 95/286 |
| 2009/0249957 A1* | 10/2009 | Lackey, Sr. ........... B01D 46/12 96/11 |

FOREIGN PATENT DOCUMENTS

WO     9955422 A1    11/1999

OTHER PUBLICATIONS

International Search Report and Written Opinion corresponding to PCT/EP2049/063633, dated Jun. 28, 2019.

* cited by examiner

*Primary Examiner* — Jason M Greene
(74) *Attorney, Agent, or Firm* — Barnes & Thornburg LLP

(57) ABSTRACT

An air filter for an air conditioning system of a railway vehicle includes a first layer of a first filter medium with a first medium surface, a second layer of a second filter medium with a second medium surface, and a peripheral frame to hold the first layer and the second layer adjacent to each other, wherein the second surface medium area is non-flat and provides a larger filter surface area than the first layer.

10 Claims, 6 Drawing Sheets

AIR FILTER AND ITS METHOD FOR MANUFACTURING

CROSS REFERENCE AND PRIORITY CLAIM

This patent application is a U.S. National Phase of International Patent Application No. PCT/EP2019/063633 filed May 27, 2019, which claims priority to European Patent Application No. 18175102.5, the disclosure of which being incorporated herein by reference in their entireties.

FIELD

The present disclosure relates to an air filter or a filtration module and its method for manufacturing and, in particular, to a high dust holding capacity filtration module for railway applications.

BACKGROUND

Vehicle air conditioners are used to maintain certain conditions of temperature, humidity and air quality in a specific compartment, like passengers' compartment in a train or in another vehicle. To perform their function, vehicle air conditioners take a certain quantity of air (which can also be equal to zero) coming from the compartment (hereinafter referred to as indoor air) and a certain quantity of air (which can also be equal to zero) coming from outside the vehicle (hereinafter referred to as outdoor air).

SUMMARY

Disclosed embodiments relate to an air filter (or a filtration module) for an air conditioning system, especially for a railway vehicle. The air filter includes a first layer of a first filter medium with a first medium surface, a second layer of a second filter medium with a second medium surface, and a peripheral frame to hold the first layer and the second layer adjacent to (or on top of) each other, wherein the second surface medium area is non-flat and provides a larger filter surface area than the first layer.

BRIEF DESCRIPTION OF THE FIGURES

Some examples of the systems and/or methods will be described in the following by way of examples only, and with respect to the accompanying figures, in which.

DETAILED DESCRIPTION

Figure 4:
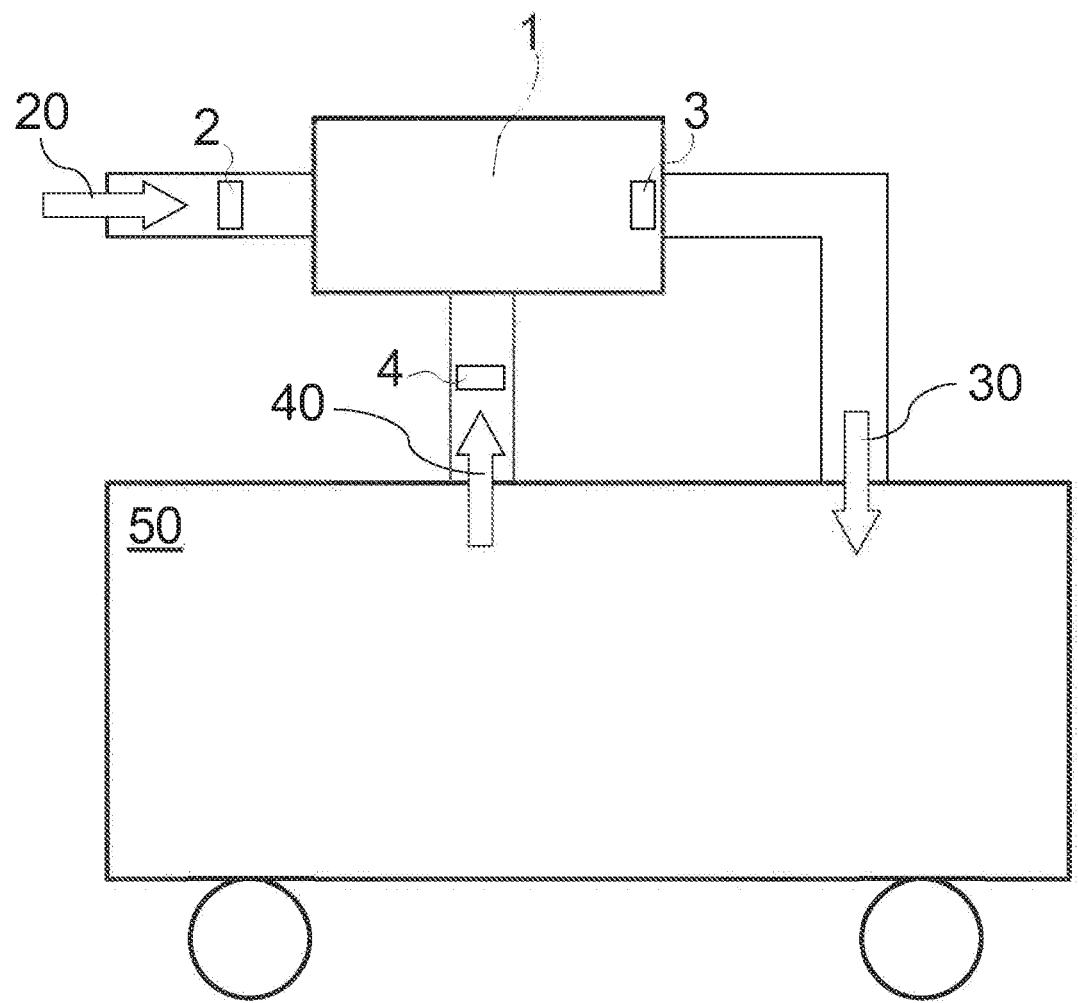
FIG. 4 depicts an exemplary air conditioning (AC) system for a railway vehicle.

FIG. 4 depicts an exemplary air conditioning (AC) system for a railway vehicle 50. The air conditioning system comprises an inlet for an outdoor air stream 20, a mixing zone 1, an inlet for an indoor air stream 40 and an outlet 3 for supply air 30 directed into the compartment. Indoor and Outdoor air 20, 40 are usually mixed in the mixing zone 1 before passing through air conditioner heat exchangers, electrical resistances, or other means that allow changing temperature and humidity of the supply air before entering the compartment.

To decrease contaminants in indoor and outdoor air, such as dust, filters 2, 3, 4 are usually inserted into the air flows 20, 30, 40. Depending on the position of the filters 2, 3, 4, several configurations are seen in practice: at least one filter 2 in the outdoor air stream 20 and at least one filter 3 after the mixing zone 1, at least one filter 2 in the outdoor air stream 20 and at least one filter 4 in the indoor air stream 40, at least one filter 3 after the mixing zone 1 only, at least one filter 4 in the indoor air stream 40 and at least one filter 3 after the mixing zone 1.

The filters 2, 3, 4 are permeable to air and to a certain extent impermeable to dust. As they retain contaminants, their air permeability decreases during operation (hereinafter referred to as clogging phenomenon) and the pressure drop trough the filter, for a given air flow, increases. Regardless of the position of the filters 2, 3, 4 in the air streams 20, 30, 40 (i.e. the chosen configuration), the increase of pressure drop affects the amount of air flow circulating in the system and/or the fan power needed to maintain that amount of air flow. For this main reason, the filters 2, 3, 4 are changed periodically, ensuring that the required quantities of indoor and outdoor air are supplied to the compartment.

Frequent maintenances increase the costs. It is thus desirable to increase the filters duration, i.e. the time they take to get clogged and need a replacement, to reduce the maintenance costs. This increase in duration should be achieved without affecting the overall quality of the air supplied to the compartment; in other words, the quantity and type of dust particles which are retained should not drop below a certain value just for the sake of obtaining longer filter duration.

Figure 5:
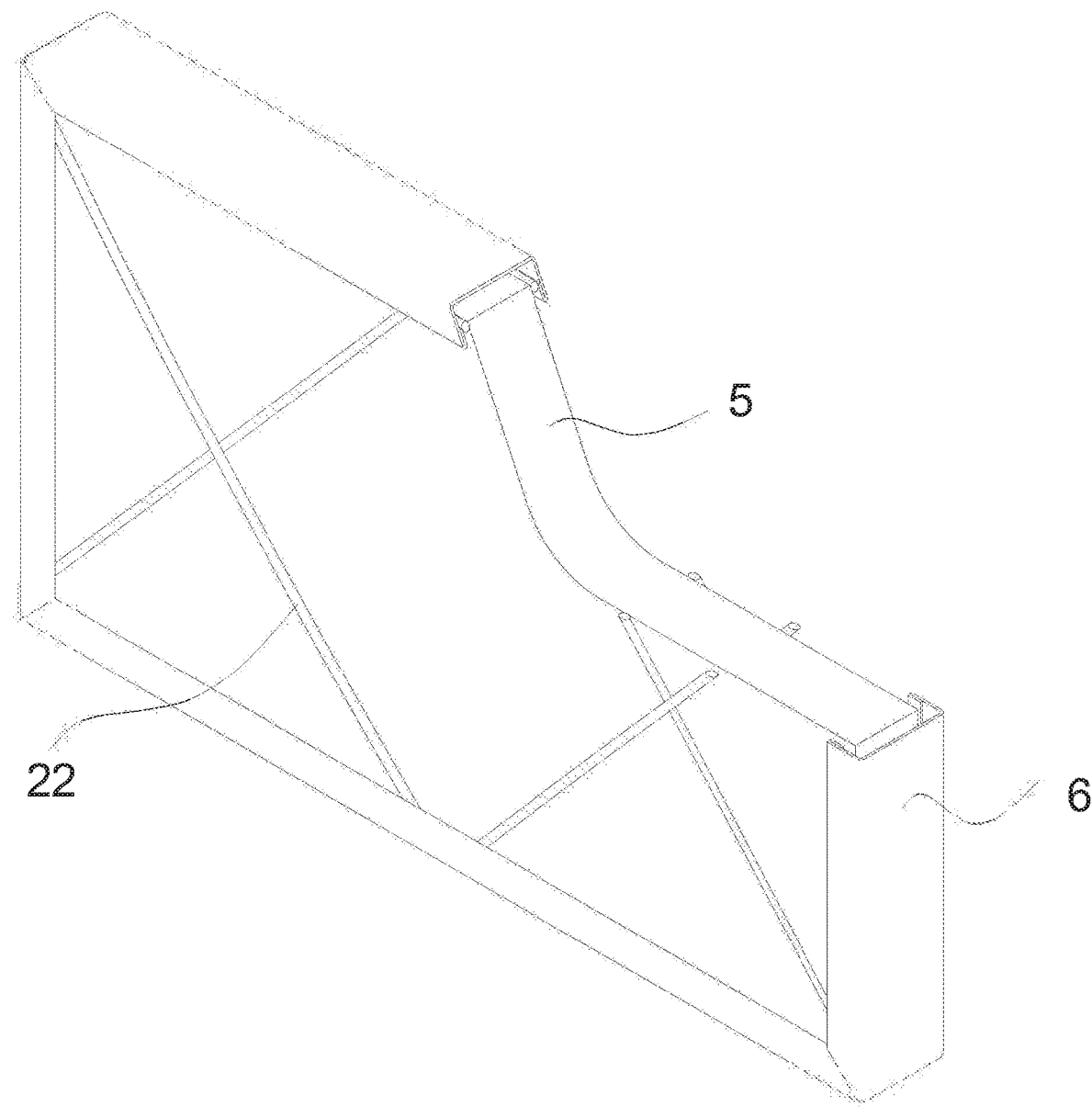
FIG. 5 depicts a conventional air filter.

FIG. 5 shows one of the simplest filter type employed in the railway sector. It is a flat panel filter comprising an air filter medium 5 formed as a flat layer with a thickness adapted to provide sufficient air filtration. The filter medium 5 is made of fibers and is retained by a metallic or carton board or synthetic material frame 6. The filter medium 5 is supported by additional fastening means 22 (for example reinforcement elements inserted between the filter medium 5 and the frame 6). However, this kind of filter has a limited capacity to retain large quantity of dust while maintaining an acceptable level of pressure drop.

Figure 6:
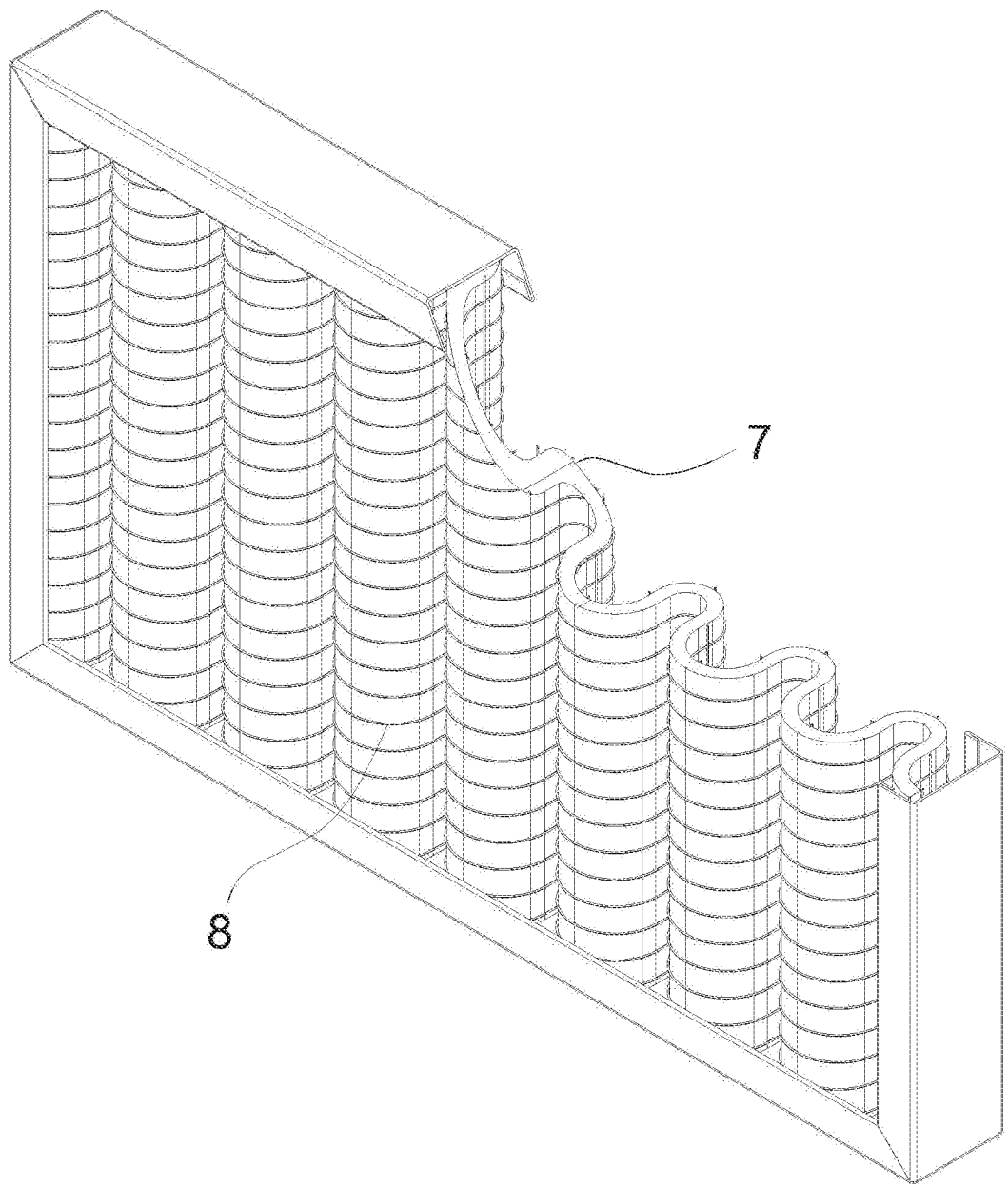
FIG. 6 depicts another conventional air filter.

FIG. 6 shows another conventional air filter that improves the duration of the filter, wherein the filter medium 7 is again held by a frame and, in addition, by a metallic mesh 8 which shapes the filter medium 7 in the form of waves to increase a surface area of the filter medium 7. The increased surface has the effect that, in addition to the filtration in the volume of the filter medium 7, the surface area provides an additional filtration of the air.

Both filters have a rather thick filter medium so that the filtration mechanism relies mainly on the volume of the filter (hereinafter referred to as depth filtration) to collect dust particles without an excessive increase in pressure drop. To avoid the clogging and to increase filter duration the depth filtration is a valid strategy. In the attempt to improve the filters, without increasing the space occupied by the filter, the number of waves or depth filtration may be increased. The drawback of this solution is that the narrower the pleats—especially when dealing with quite thick mediums—the higher the chance of pleats pinching together as well as the risk of compressing the filter medium reducing the actual available volume.

Therefore, there is a demand for other air filters that avoid these problems.

At least some of the problems of the conventional air filters are overcome by an air filter and a method of its manufacturing as disclosed herein. Disclosed embodiments relate to an air filter (or a filtration module) for an air conditioning system, especially for a railway vehicle. The air filter includes a first layer of a first filter medium with a first medium surface, a second layer of a second filter medium with a second medium surface, and a peripheral frame to hold the first layer and the second layer adjacent to (or on top of) each other, wherein the second surface medium area is non-flat and provides a larger filter surface area than the first layer.

The first and second filter medium should be understood as particular materials with a particular packing density. Since the material of the layers may include various kinds of fibers the properties of the layers will be determined by the density of the fibers arranged within a particular volume. This, in turn, determines how much contamination can be stored within the filter medium. It is further understood that the medium surface relates not only to its geometry (flat, curved, wavy, pleated etc.), but also to its surface area.

The second layer may therefore comprise a pleated layer material (or has an otherwise curved surface). On the other hand, the first layer may comprise a flat surface. Optionally, the first layer is glued/melted or otherwise fixed on one side of the pleated second layer to provide air cavities between the first layer and the second layer. This has the advantage of providing stability. No reinforcement elements or fastening means are needed because the pleated second layer may already provide sufficient support for the layer structure of the air filter.

It is understood, that the notion "first layer" does not imply necessarily that this layer comes first along the flow direction of air through the filter. It is only a name to distinguish this layer from the second layer. Disclosed embodiments cover both possibilities, namely that air flowing through the air conditioning system enters the air filter through the first layer or through the second layer. In addition, it is likewise possible that also the first layer is non-flat (e.g. pleated). Furthermore, it is understood that the notion "a first layer" and "a second layer" implies that there are at least one of such layers. Therefore, disclosed embodiments also cover air filters with two first flat layers and two pleated layers.

The filtrations of both layers may rely on different mechanisms. For example, the first layer may store the contamination in its interior (volume or depth filtration), whereas the second layer may store the contamination primarily on its enlarged surface (surface filtration). For example, an area of the second medium surface is more than two times the area of the first medium surface. However, the invention shall not be limited on particular surface area ratios. But it is of advantage, if both filtrations mechanisms are combined, because some contaminants are better absorbed by volume filtration whereas others are filtered effectively by surface filtration.

Optionally, the first layer comprises at least one of the following materials: glass fibers, synthetic fibers, a mix of organic and synthetic fibers. Similarly, the second layer may comprise a least one of the following materials: glass fibers, synthetic fibers, a mix of organic and synthetic fibers, cellulose fibers.

Optionally, the first layer is arranged to be upstream, with respect to an air flow direction through the filter, from the second layer and comprises a lower packing density than the second layer. For example, the first layer comprises a packing density of less than 0.05, or less than 0.04 or less than 0.03. Similarly, the second layer may comprise a packing density of more than 0.05 or at least as large as the packing density of the first layer. The packing density may be defined as the ratio between the volume occupied by the filter material (e.g. the fibers) and the total volume occupied by the filter medium of the respective layer.

Optionally, the air filter comprises at least one additional layer of a filter medium forming with the first layer and the second layer a plurality of layers held by the peripheral frame on top of each other. Along the flow direction through the air conditioning system with such air filter, the packing density may increase stepwise from layer to layer. In addition, the filter layers are formed so that, from layer to layer, the volume filtration may decrease whereas the surface filtration increases.

Optionally, the frame is configured to allow an unconstrained air flow to enter the first layer, in particular without being split by any reinforcement elements. Hence, according to further embodiments the air filter provides sufficient stability without having additional enforcement elements such as the fastening means or the mesh as in the conventional air filters.

Disclosed embodiments relate likewise to a method for manufacturing an air filter for an air conditioning system. The method comprises:

providing a first layer of a first filter medium with a first medium surface;

providing a second layer of a second filter medium with a second medium surface; and arranging a peripheral frame to hold the first layer and the second layer adjacent to each other, wherein the second surface medium area is non-flat and provides a larger filter surface area than the first layer.

Optionally, the method may further include a fixing of the second, pleated layer on the first layer to enable a reinforcement of the first layer by the pleated second layer. This fixation may include a gluing, melting or any other permanent fixation.

In short, embodiments solve at least some of the mentioned problems by an arrangement where depth filtration is combined with surface filtration in a compact filtration module.

Figure 1:
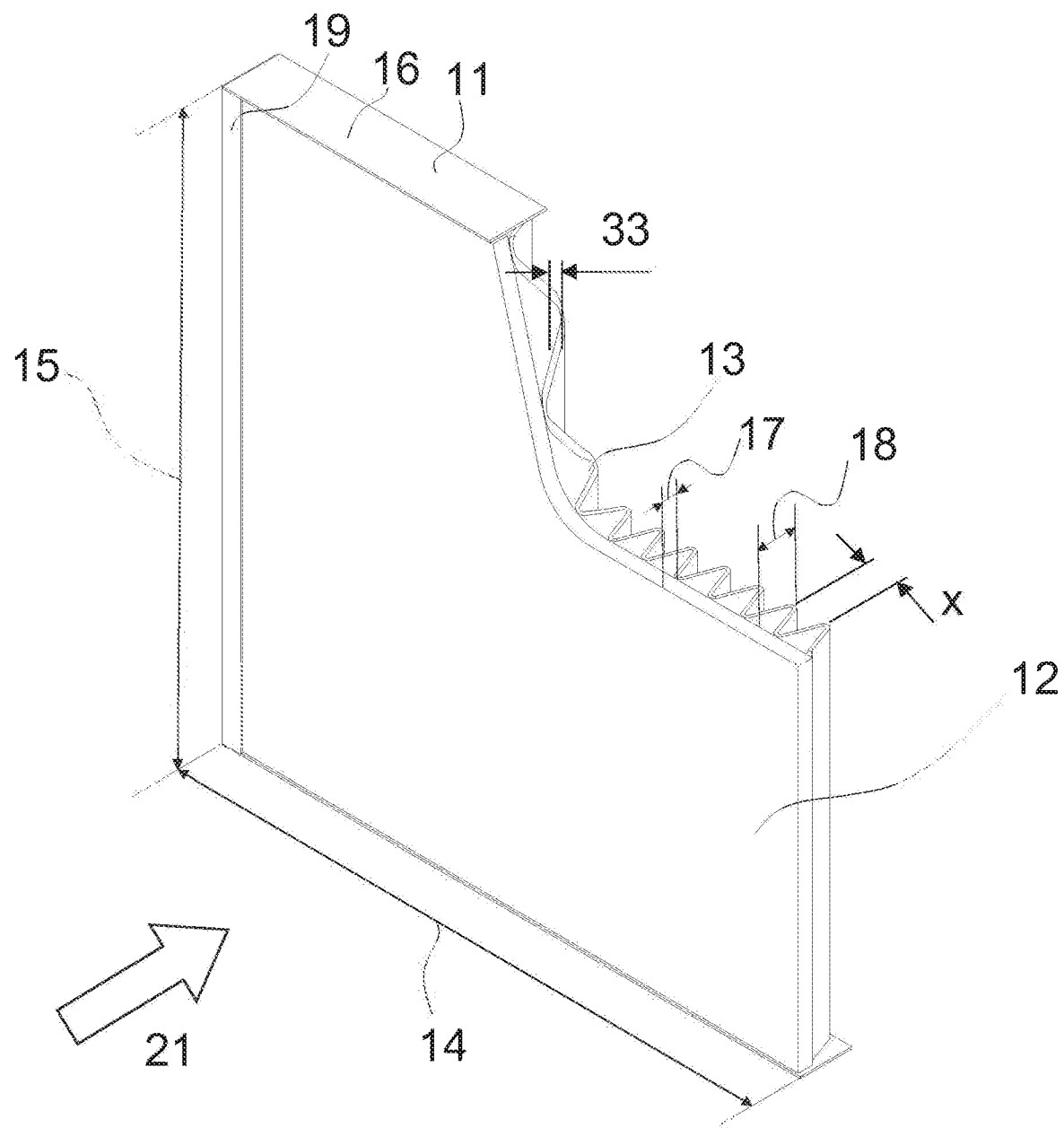
FIG. 1 depicts an air filter according to an embodiment of the present disclosure.

FIG. 1 depicts an air filter according to an embodiment of the present disclosure. The air filter comprises a first layer 12 of a first filter medium with a first medium surface and a second layer 13 of a second filter medium with a second medium surface. The first layer 12 and the second layer 13 are both held by the frame 11 on top of each other.

The second layer 13 has a non-flat surface providing an enlarged filter surface area compared to the flat first layer 12. In particular, the second layer 13 is formed as a pleated layer. According to advantageous embodiments, the second layer 13 is glued to the frame 11 and the first layer 12 is simply seating on the second layer 13. Moreover, the frame 11 has two kinds of vertical flaps 19, one per side, which are pleated and glued to the first layer 12. In this way the first layer 12 is retained within the vertical flaps 19 and the second layer 13 which is glued to the frame 11. Optionally, there may be some permanent fixation between the two layers 12, 13, like for instance with glue on the peaks of the pleats of the second layer 13. Hence, the second layer 13 may or may not be glued or otherwise fixed on the first layer 12 to provide by the pleats sufficient stability of the air filter. As a result, metallic meshes 8 or the fastening means 22 as in the conventional air filters in FIGS. 5 and 6 are not needed for the air filter according to embodiments of the present disclosure. This implies in turn that an air stream 21 through the air filter is not split but flows without obstructions through the filter medium within the frame 11.

Along the air flow direction 21 through the air filter, the air passes first the first layer 12 followed by the second layer 13. The first layer 12 may comprise a larger thickness 17 than the second layer 13 which is formed with a thinner thickness 33, but instead with a pleated structure. Moreover, the packing density of the first layer 11 can be equal or smaller than the packing density of the material of the second layer 13.

The frame 11 comprises a depth 16, a height 15 and a width 14. The width 14 and the height 15 of the filtration module can vary, according to the geometry of the duct or air passage of the vehicle air conditioner. For example, in one application the width 14 may be in the range of 300 mm to 600 mm, the height 15 may be in the range of 200 mm to 400 mm. The filtration module can be designed in any other dimensions as long as it maintains a sufficient rigidity during operation. Advantageously, the front part 19 is pleated, in order to create a frontal frame for the first layer, as shown in FIG. 1. In fact, two vertical sides of the frame 11 are deeper than the depth 16, but they are then pleated during manufacturing and the final depth of the frame is equal to 16. If needed also the top and bottom side of the frame 11 can be made longer and pleated (so that the first layer 12 has a small frontal frame). Optionally, the filtration module depth 16 can vary depending on the available space. It may also be larger than the combined thickness of the first layer 12 and the second layer 13 to provide a front part 19 for air guidance and additional support. For a given flow rate, deeper modules can reach longer duration (because they can store more contaminations).

The depth 17 of the first layer 12 may be at least 5 mm and can be adjusted to the needs to provide sufficient volume filtration. The first layer 12 may further have low packing density (e.g. less than 0.04 or 0.03), which can be conveniently varied depending on the desired grade of compression of the first layer 12 inside the peripheral fastening frame 11. The filter medium of the first layer 12 may include various fibers. Exemplary fiber materials for the first layer are glass fibers or synthetic fibers or a mix of organic and synthetic fibers.

The second layer 13 is made of thin filter medium (thickness 33 may range from less than 1 mm up to 20 mm). The second layer 13 is pleated to increase available filtering surface to enable surface filtration, wherein the number of pleats depends on filter medium thickness and the overall filtration module depth 16. The number of pleats may be maximized as long as no pinching of the pleats as well as undesired filter medium compression takes place. For example, if the filter medium thickness 33 is about 1 mm the second layer 13 can be pleated so that the pleats have peaks spaced apart by a distance x in the range of 15 mm to 25 mm. The height 18 of the peaks may be in the range of 30 mm to 40 mm.

As already stated, deeper filtration modules may have longer lifetime for filtration, which depends likewise from the packing density providing more or less volume for decontaminations. The second layer 13 may have higher packing density than the first layer 12 (more than 0.05) or at least as large as (or at least 50% more than) the packing density of the first layer 12.

The filter medium of the second layer 13 may likewise include various fibers. Exemplary materials for the second layer fibers are glass fibers, synthetic fibers, mix of organic and synthetic fibers or cellulose fibers. The second layer 13 is optionally bonded to the peripheral frame 11 with adhesive, maintaining pleats at the desired distance, sealing the interface between the frame and the layer, and increasing rigidity of the peripheral frame. Since the first layer 12 is fixed together with the pleated second layer 13 and the front 19 in the peripheral frame 11, air flow pushing the first layer 12 against the second layer 13 is securely supported. In contrast to conventional air filters, there is no need for the fastening elements 22 (FIG. 5) or metallic mesh 8 (FIG. 6).

The shown air filter may be a filtration module which can be combined with other filtration modules. For example, the frame 11 may have a rectangular shape (or triangular, hexagonal etc.) to allow aligning several filtration modules disposed side by side, depending on the dimensions of the air passage.

Figure 2:
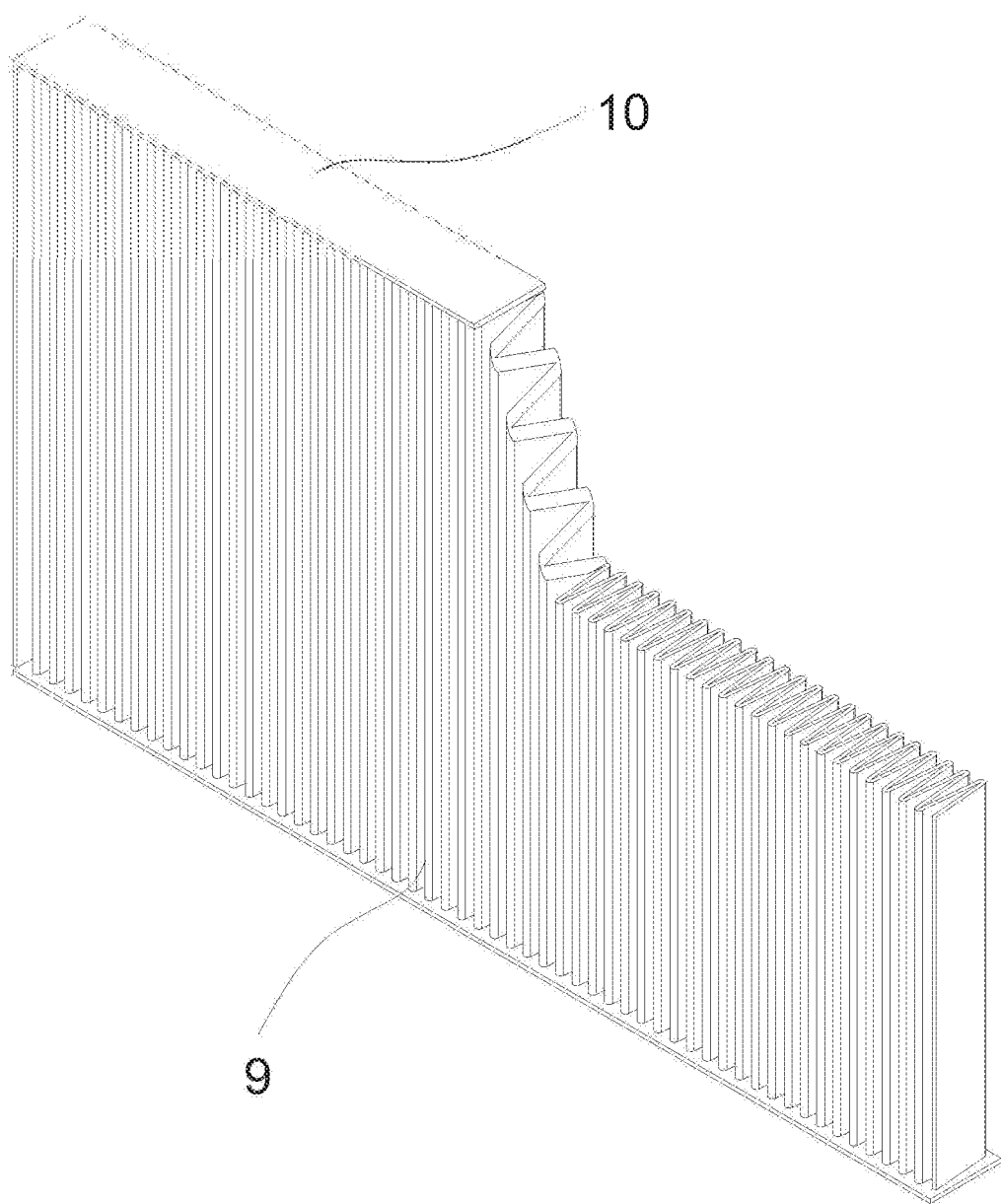
FIG. 2 depicts an example for the pleated air filter medium which is held within a (additional) frame.

FIG. 2 shows further details of the pleated air filter medium 9 which is held within a frame 10. According to the present disclosure at least one of such layer will be included in the air filter as second layer 13. The distance between adjacent pleats can vary according to the filtration requirements.

For the second layer 13, the filter medium 9 is thinner than for the first layer 12 to allow a sufficient high number of pleats so that the filtration mechanism relies mainly on the surface of the filter (surface filtration). An advantage of the surface filtration relates to the collection of dust particles by the surface without an excessive increase in pressure drop. Moreover, with the thinner medium (may only be 1 mm or 2 mm or 5 mm thick) the pleats can be formed during manufacturing and later be retained in position by bonding them to the separate frame 10 or together with the frame 11 of FIG. 1 with adhesive and/or by using pleats spacers.

Figure 3:
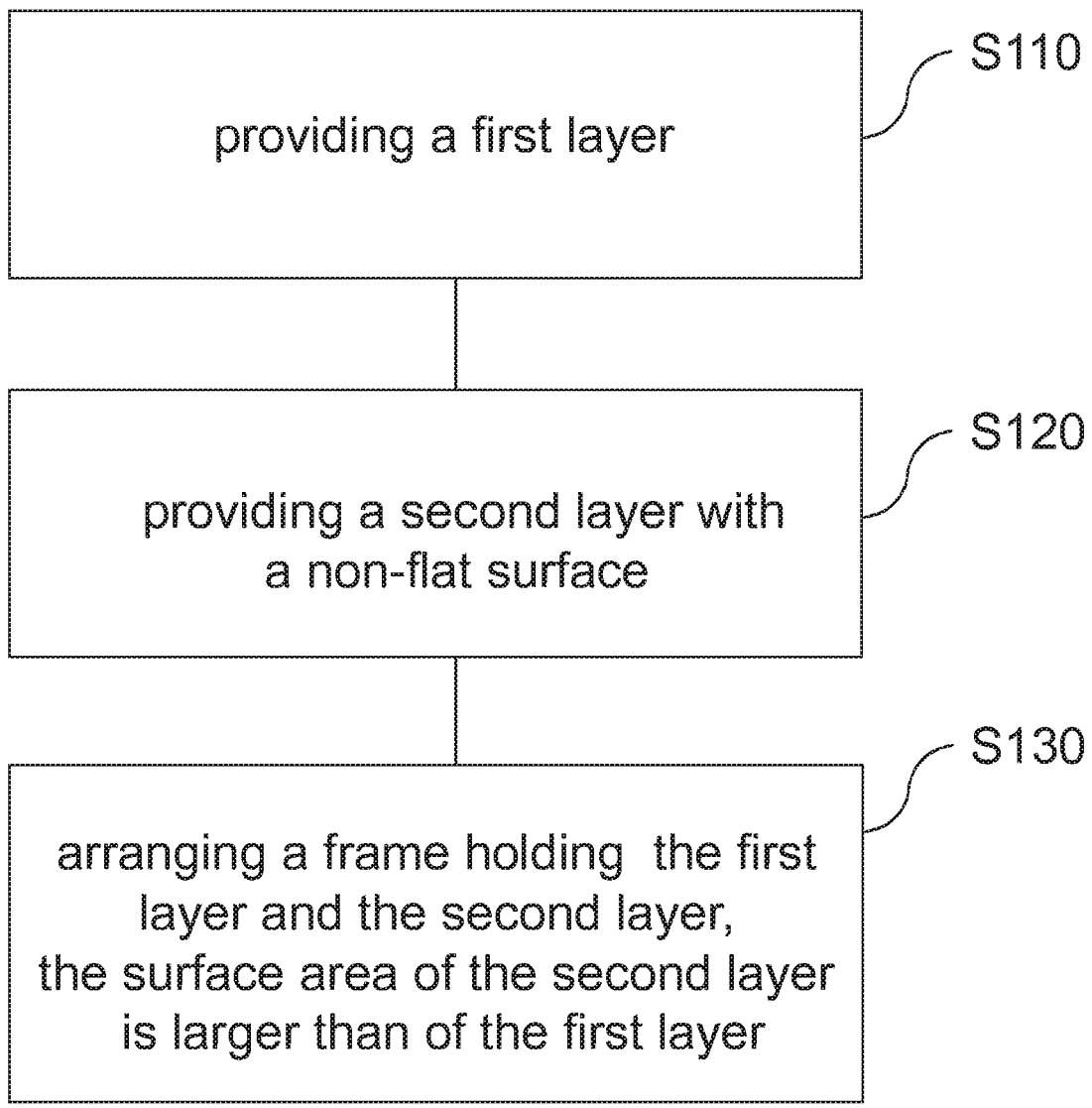
FIG. 3 shows an exemplary flow chart for a method of manufacturing of the air filter according to an embodiment of the present disclosure.

FIG. 3 depicts a flow diagram of a method for manufacturing an air filter for an air conditioning system according to embodiments of the present disclosure. The method comprises:

providing S110 a first layer 12 of a first filter medium with a first medium surface;

providing S120 a second layer 13 of a second filter medium with a second medium surface; and arranging S130 a peripheral frame 11 to hold the first layer 12 and the second layer 13 adjacent to each other, wherein the second surface medium area is non-flat and provides a larger filter surface area than the first layer.

Embodiments combine a minimum of two layers 12, 13 of filter medium together within a peripheral fastening frame 11. Although the invention shall not be restricted to this, the first layer 12 can be of straight filter medium, similar to the filter medium 5 in FIG. 5. The first layer 12 retains part of the incoming dust through depth or volume filtration. A second layer 12 can be of the pleated type as the filter medium 9 in FIG. 2. The number of pleats can vary depending on the medium thickness. In order to further improve the duration of the filtration module, the filter medium employed in each layer has a specific ratio between volume occupied by the fibers and total occupied volume (hereinafter referred to as packing density). The packing density is either constant or increased at each layer, together with medium surface, in the air flow direction.

According to further embodiments further layers are provided to enable an air filter with a plurality of layers. For example, the first layer 12 can again be formed in a flat form as shown in FIG. 1, followed by a second layer 13 formed with some pleats followed by a third layer formed with more pleats so that the surface area will increase from layer to layer for an airflow 21 passing through the air filter.

Advantageous embodiments of the present disclosure may be summarized as follows:

An air filtration module according to the present disclosure can be employed in a railway vehicle air conditioner and is composed by a minimum of two layers 12, 13 of filter medium, each layer having different geometry increasing the medium surface in the air flow direction 21 and employing the same or an increasing packing density at each layer in the air flow direction 21. All Filter layers can be contained within a peripheral fastening frame 11.

According to yet another embodiment of the filtration module, there is composition by two layers 12, 13 of filter medium, wherein the first layer fibers are made of either glass fibers, or synthetic fibers, or a mix of organic and synthetic fibers and the second layer fibers are made of either glass fibers, or synthetic fibers, or a mix of organic and synthetic fibers or cellulose fibers.

According to yet another embodiment of the filtration module, the first layer 12 has low packing density (less than 0.03) and the second layer 13 has higher packing density (more than 0.05).

According to yet another embodiment of the filtration module, the second layer surface is more than two times the first layer surface.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

1 mixing zone of an air conditioning system
2, 3, 4 air filters
5, 7 conventional filter mediums
6 conventional frame
8 metallic mesh
9 thin, pleated filter medium
10, 11 peripheral frames
12 first layer
13 second layer
14 width of the air filter
15 height of the air filter
16 depth of the peripheral frame
17 depth of the first layer
18 depth of the second layer
19 front part of the frame
20 outdoor air stream
21 air flow direction
22 fastening elements
33 medium thickness of the second layer
40 indoor air stream
50 railway vehicle
x distance between peaks of pleats

The invention claimed is:

1. An air filter for an air conditioning system of a railway vehicle, the air filter comprising:
   a first layer of a first filter medium with a first medium surface;
   a second layer of a second filter medium with a second medium surface; and
   a peripheral frame to hold the first layer and the second layer adjacent to each other,
   wherein the second surface medium area is non-flat and provides a larger filter surface area than the first layer,
   wherein the second layer comprises a pleated layer material,
   wherein the first layer comprises a flat surface and is glued on one side of the pleated second layer to provide air cavities between the first layer and the second layer, which is configured to filter air along an air flow direction, and wherein the first layer is arranged to be upstream from the second layer and comprises a lower packing density than the second layer, and
   wherein the frame is configured to enable an unconstrained air flow to enter the first layer without being split by any reinforcement elements.

2. The air filter of claim 1, wherein an area of the second medium surface is more than two times the first medium surface.

3. The air filter of claim 1, wherein the first layer comprises at least one of the following materials: glass fibers, synthetic fibers, a mix of organic and synthetic fibers.

4. The air filter of claim 1, wherein the second layer comprises a least one of the following materials: glass fibers, synthetic fibers, a mix of organic and synthetic fibers, cellulose fibers.

5. The air filter of claim 1, wherein the first layer comprises a packing density of less than 0.04 or less than 0.03; and/or the second layer comprises a packing density of more than 0.05.

6. A method for manufacturing an air filter for an air conditioning system of a railway vehicle, the method comprising:
   providing a first layer of a first filter medium with a first medium surface;
   providing a second layer of a second filter medium with a second medium surface; and
   arranging a peripheral frame to hold the first layer and the second layer adjacent to each other, wherein the second surface medium area is non-flat and provides a larger filter surface area than the first layer,
   wherein the second layer is a pleated layer and the method further comprises fixing the second, pleated layer on the first layer to enable a reinforcement of the first layer by the pleated second layer,
   wherein the first layer comprises a flat surface and is glued on one side of the pleated second layer to provide air cavities between the first layer and the second layer,
   wherein the air filter is configured to filter air along an air flow direction, and wherein the first layer is arranged to be upstream from the second layer and comprises a lower packing density than the second layer, and
   wherein the frame is configured to enable an unconstrained air flow to enter the first layer without being split by any reinforcement elements.

7. The method of claim 6, wherein an area of the second medium surface is more than two times the first medium surface.

8. The method of claim 6, wherein the first layer comprises at least one of the following materials: glass fibers, synthetic fibers, a mix of organic and synthetic fibers.

9. The method of claim 6, wherein the second layer comprises a least one of the following materials: glass fibers, synthetic fibers, a mix of organic and synthetic fibers, cellulose fibers.

10. The method of claim 6, wherein the first layer comprises a packing density of less than 0.04 or less than 0.03; and/or the second layer comprises a packing density of more than 0.05.

* * * * *